G. SILVESTRI.
ROTARY ENGINE.
APPLICATION FILED OCT. 28, 1912.
1,134,357.
Patented Apr. 6, 1915.
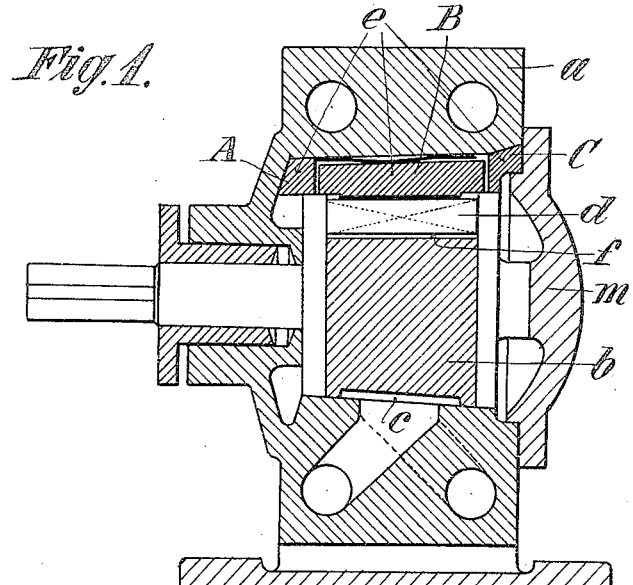
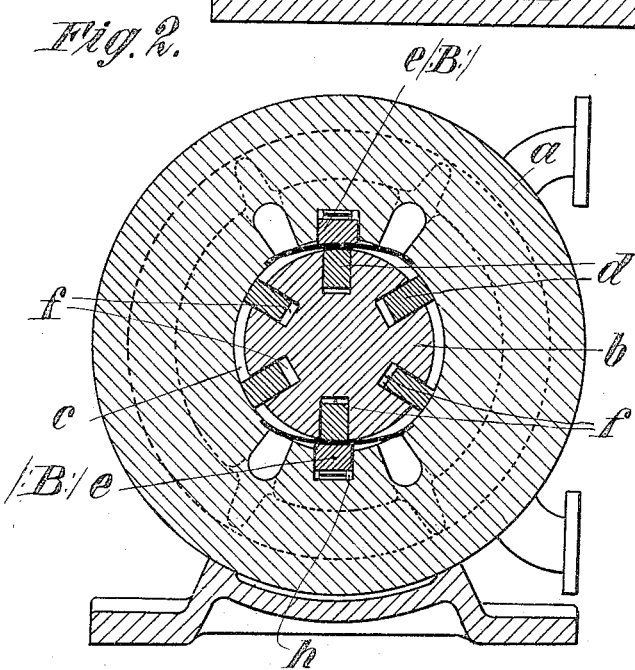
Witnesses:
W. K. Boulter
W. A. Ward
Inventor:
Giulio Silvestri
by Wm E. Boulter
his Attorney.

UNITED STATES PATENT OFFICE.

GIULIO SILVESTRI, OF VIENNA, AUSTRIA-HUNGARY.

ROTARY ENGINE.

1,134,357.   Specification of Letters Patent.   Patented Apr. 6, 1915.

Application filed October 28, 1912. Serial No. 728,115.

*To all whom it may concern:*

Be it known that I, GIULIO SILVESTRI, a citizen of Austria, and resident of Vienna, Lower Austria, Austria-Hungary, have invented certain new and useful Improvements in Rotary Engines, of which the following is a specification.

This invention relates to rotary engines operated by an expansible fluid.

A defect of rotary engines having pistons radially displaceable in the rotatable piston drum and more especially when operating as a motor driven by an expansible fluid resides in the inadequacy of the packing. The conical form of the rotatable piston drum which is ground into the stator casing heretofore proposed for remedying the above defect only partially remedies the same, because as the pistons pass over the packing piece which separates the inlet side of the working chamber from the outlet side thereof transitory leakages occur at the ends of the guide slots for the pistons in the piston drum, since these ends periodically cover the joints at the ends of the packing piece between the latter and the stator casing.

The present invention remedies the above mentioned defect of rotary engines of the above-described type with conical piston drums by causing the packing to protrude beyond the faces of the pistons which are parallel to the plane of rotation of the piston drum whereby the joint there is covered.

The drawing illustrates the invention and in said drawing:

Figure 1 is a longitudinal section in the direction of the axis of the piston drum, and Fig. 2 a transverse section perpendicular thereto.

Rotatably mounted in the stator casing $a$, is the conical piston drum $b$, which casing is provided with the annular working chamber $c$, and $d$, are a plurality of pistons which are displaceable in radial slots $f$, in the drum, said pistons being longer in the direction of the axis of the piston drum than the working chamber, for the purpose of providing a good fluid-tight joint between the piston drum with its guide slots and the surfaces perpendicular to the plane of rotation of the piston drum.

The packing piece $e$, which separates the inlet side of the working channel from the outlet side is let into a longitudinal groove $h$, of the casing and in the example shown two such packing pieces $e$, and six radial displaceable pistons $d$, are provided. According to the invention these packing pieces are so dimensioned that they extend on both sides beyond the end faces of the piston guide slots which are parallel to the plane of rotation of the piston drum and so cover the joints at these points even when the piston guide slots pass over the packing pieces. The packing pieces $e$, which separate the inlet from the outlet consequently effect a completely fluid-tight joint at the lateral end faces of the piston guide slots even with the piston pressed back by said pieces.

For the purpose of facilitating the insertion and fitting of the packing piece the latter is constructed as a packing fillet extending the entire length (depth) of the casing $a$, and slightly wedge-shape converging in the direction of the convergence of the conical drum which packing after being fitted in the groove $h$, of the casing is so divided into three pieces A, B and C, that the divisions are situated at points outside the end surfaces of the piston.

The part A prior to insertion of the piston drum is secured in the casing $a$, or in the corresponding cover of the latter, then the actual packing piece B is inserted and after the piston drum has been introduced, the part C is inserted and is held in position by the cover $m$. It is obvious that the part B of the packing piece can follow all movements of the piston drum in an axial direction, and consequently the covering of the joint at the ends of the piston guide slots is permanently assured.

What I claim is:

In a rotary engine, the combination with a stator casing, and a rotatable conical piston drum therein, an annular working chamber being provided intermediate the inner circular wall of the casing and the circumference of the piston drum, of pistons radially displaceable in slots in said drum, said pistons being longer in the direction of the axis of the drum than the said working chamber, and a packing device arranged in a longitudinal groove of the casing and separating the inlet side of the working chamber from the outlet side thereof, said packing device being divided into three parts, i. e. a middle portion B and end portions A and C, the said middle portion serving as the actual packing piece and being of such length as to extend beyond the end faces of the slots for the pistons, which faces are parallel to the plane of rotation of the piston drum.

Signed at Vienna, Lower Austria, Austria-Hungary, this 21st day of September, A. D. 1912.

GIULIO SILVESTRI.

Witnesses:
WILHELM BERGER,
AUGUST FUGGER.